United States Patent
Suh et al.

(10) Patent No.: US 10,922,168 B2
(45) Date of Patent: Feb. 16, 2021

(54) DYNAMIC LINK ERROR PROTECTION IN MEMORY SYSTEMS

(71) Applicant: QUALCOMM Incorporated, San Diego, CA (US)

(72) Inventors: Jungwon Suh, San Diego, CA (US); Alain Artieri, San Diego, CA (US); Dexter Tamio Chun, San Diego, CA (US); Deepti Vijayalakshmi Sriramagiri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/503,368

(22) Filed: Jul. 3, 2019

(65) Prior Publication Data

US 2019/0324850 A1   Oct. 24, 2019

Related U.S. Application Data

(63) Continuation of application No. 15/682,533, filed on Aug. 21, 2017, now Pat. No. 10,387,242.

(51) Int. Cl.
*G11C 29/00* (2006.01)
*G06F 11/10* (2006.01)
*G06F 3/06* (2006.01)

(52) U.S. Cl.
CPC .......... *G06F 11/1048* (2013.01); *G06F 3/068* (2013.01); *G06F 3/0619* (2013.01); *G06F 3/0659* (2013.01); *G06F 11/10* (2013.01)

(58) Field of Classification Search
CPC .... G06F 11/1048; G06F 3/068; G06F 3/0619; G06F 3/0659
See application file for complete search history.

(56) References Cited

U.S. PATENT DOCUMENTS 6,321,361 B1   11/2001   Autechaud et al.
7,180,947 B2    2/2007   Minton et al.
(Continued)

FOREIGN PATENT DOCUMENTS

WO   2017052661 A1   3/2017
WO   2018038813 A1   3/2018

OTHER PUBLICATIONS

International Search Report and Written Opinion—PCT/US2018/039978—ISA/EPO—dated Oct. 31, 2018.
(Continued)

*Primary Examiner* — Samir W Rizk
(74) *Attorney, Agent, or Firm* — Muncy, Geissler, Olds & Lowe, P.C.

(57) ABSTRACT

Errors can be introduced when data is transferred over a link between two entities such as between a host and a memory. Link error protection schemes can be implemented to detect and correct errors that occur on the link to enhance transmission reliability. However, these benefits are not without costs since such protection schemes increase both latency and power consumption. In one or more aspects, it is proposed to dynamically adjust the level of link error protection applied to match any change in the operating environment. For example, likelihood of link errors strongly correlates with the link speed. If the link speed is increased, a greater level of link error protection can be applied to counteract the increase in the link errors. If the link speed is decreased, the level of protection can be decreased so that latency and power consumption penalties can be minimized.

20 Claims, 6 Drawing Sheets

(56) References Cited

U.S. PATENT DOCUMENTS

| | | |
|---|---|---|
| 8,495,467 B1 | 7/2013 | Billing et al. |
| 8,806,298 B2 | 8/2014 | Bains |
| 9,306,863 B2 | 4/2016 | Birrittella |
| 2006/0026315 A1 | 2/2006 | Hong et al. |
| 2006/0277434 A1 | 12/2006 | Tsern et al. |
| 2007/0162825 A1 | 7/2007 | Wang et al. |
| 2011/0066818 A1 | 3/2011 | Yu et al. |
| 2012/0278681 A1 | 11/2012 | Moyer et al. |
| 2013/0318289 A1 | 11/2013 | Tomlin |
| 2015/0347015 A1 | 12/2015 | Pawlowski et al. |
| 2017/0147431 A1 | 5/2017 | West et al. |
| 2017/0147432 A1 | 5/2017 | Suh et al. |
| 2017/0177432 A1 | 6/2017 | Fader et al. |
| 2018/0196710 A1 | 7/2018 | Iyer et al. |
| 2019/0056990 A1 | 2/2019 | Suh et al. |
| 2019/0172512 A1* | 6/2019 | Oh .................. G11C 7/1069 |

OTHER PUBLICATIONS

JEDEC: "Proposed HBM DRAM Specification Update Rev 2.10," Solid State Technology Association, Committee Letter Ballot, JC-42.3C, Item No. 1797.99H, 2011, 179 pages.

JEDEC Standard: "Graphics Double Data Rate (GDDR5) SGRAM Standard," JESD212C, JEDEC Solid State Technology Association, Feb. 2016, 158 pages.

JEDEC Standard JESD223A, Universal Flash Storage (UFS) Host Controller Interface, Jun. 2012, 58 pages.

Lautenschlaeger W., et al., "Global Synchronization Protection for Bandwidth Sharing TCP Flows in High-Speed Links", 2015 IEEE 16th International Conference on High Performance Switching and Routing (HPSR), 8 Pages.

* cited by examiner

MRxx definition (OP: Operand)

| OP[7] | OP[6] | OP[5] | OP[4] | OP[3] | OP[2] | OP[1] | OP[0] |
|---|---|---|---|---|---|---|---|
| Reserved for Future Use |  |  |  | RECC |  | WECC |  |

| Function | Register Type | Operand | Operation |
|---|---|---|---|
| WECC | Write only | OP[1:0] | 00: Write link ECC disable<br>01: Write link ECC correction enable<br>10: Write link ECC detection enable<br>11: Write link ECC correction & detection enable |
| RECC | Write only | OP[3:2] | 00: Read link ECC disable<br>01: Read link ECC correction enable<br>10: Read link ECC detection enable<br>11: Read link ECC correction & detection enable |

*FIG. 2*

| FSP | OP[7:0] |
|---|---|
| MRxx FSP[0] (low speed) | XXXX0000 |
| MRxx FSP[1] (middle speed) | XXXX0101 |
| MRxx FSP[2] (high speed) | XXXX1101 |

*FIG. 3*

DYNAMIC LINK ERROR PROTECTION IN MEMORY SYSTEMS

CLAIM OF PRIORITY UNDER 35 U.S.C. § 120

The present application for patent is a Continuation of patent application Ser. No. 15/682,533 entitled "DYNAMIC LINK ERROR PROTECTION IN MEMORY SYSTEMS" filed Aug. 21, 2017, and assigned to the assignee hereof and hereby expressly incorporated by reference herein.

BACKGROUND

Field of Disclosure

The field of the disclosed subject matter relates to memory systems. In particular, the field of the disclosed subject matter relates to dynamic link error protection in memory systems.

Background

There can be errors in data transfers between hosts and memories. As memory link operations become faster to meet higher bandwidth requirements, the probability of data transfer errors in a link between memory devices and a host (e.g., system-on-chip (SoC), CPU) becomes greater. One reason is that the high speed link is more susceptible to clock jitter, PDN (Power Delivery Network) noise, etc.

To enhance reliability, an error protection scheme may be applied to the memory link. For example, a conventional memory subsystem may include error-correction-code (ECC) encoder and decoder on the host side and complimentary ECC encoder and decoder on the memory device side. When the host wishes to write data to the memory device, the host sends a WRITE command and provides WRITE DATA to the memory device over the link. To protect the WRITE DATA, the ECC encoder on the host side encodes the WRITE DATA prior to sending the WRITE DATA over the link. The ECC decoder on the memory device side decodes the encoded WRITE DATA, and the decoded WRITE DATA is stored in the memory cells of the memory device.

When the host wishes to read data from the memory device, the host sends a READ command to the memory device over the link. The memory device retrieves READ DATA from the memory cells and sends the retrieved READ DATA to the host over the link. To protect the READ DATA, the ECC encoder on the memory device side encodes the READ DATA prior to sending the READ DATA to the host. The ECC decoder on the host side decodes the encoded READ DATA, and the decoded READ DATA is provided to a requester such as the CPU.

Unfortunately, providing such a protection scheme usually increases performance latency due to the encoding and decoding overhead. Also, additional power is required, which may be particularly significant in mobile systems.

SUMMARY

This summary identifies features of some example aspects, and is not an exclusive or exhaustive description of the disclosed subject matter. Whether features or aspects are included in, or omitted from this Summary is not intended as indicative of relative importance of such features. Additional features and aspects are described, and will become apparent to persons skilled in the art upon reading the following detailed description and viewing the drawings that form a part thereof.

An exemplary apparatus is disclosed. The apparatus may comprise a memory device configured to communicate with a host over a link. The memory device may comprise a plurality of memory cells and a memory link interface. The memory link interface may be configured to receive a READ command or a WRITE command from the host over the link. In response to the READ command, the memory link interface may be configured to retrieve READ DATA from the plurality of memory cells and provide the READ DATA to the host over the link in accordance with an applied link protection mode. In response to the WRITE command, the memory link interface may be configured to receive WRITE DATA from the host over the link and store the WRITE DATA to the plurality of memory cells in accordance with the applied link protection mode. The memory device may be configured to implement a plurality of link protection modes including a first link protection mode and a second link protection mode. The link protection modes may be applied to protect at different levels of protection the READ DATA or the WRITE DATA transmitted over the link from errors. The memory device may be configured to change from applying the first link protection mode to applying the second link protection mode in response to a link protection mode change notification received from the host.

Another exemplary apparatus is disclosed. The apparatus may comprise a host configured to communicate with a memory device over a link. The host may comprise a host link interface configured to interface with the link, and a memory controller configured to communicate with the memory device through the host link interface. The memory controller may be configured to issue a READ command or a WRITE command to the memory device over the link. Upon issuing the READ command, the memory controller may be configured to receive READ DATA from the memory device over the link in accordance with an applied link protection mode. Upon issuing the WRITE command, the memory controller may be configured to provide WRITE DATA to the memory device over the link in accordance with the applied link protection mode. The host may be configured to implement a plurality of link protection modes including a first link protection mode and a second link protection mode. The link protection modes may be applied to protect at different levels of protection the READ DATA or the WRITE DATA transmitted over the link from errors. The host may be configured to change from applying the first link protection mode to applying the second link protection mode in response to a link speed change.

An exemplary method of an apparatus is disclosed. The apparatus may comprise a host and a memory device configured to communicate with each other over a link. The method may comprise changing the apparatus from applying a first link protection mode to applying a second link protection mode in response to a link speed change. The method may comprise issuing a READ command by the host to the memory device over the link, and providing READ DATA by the memory device to the host over the link in accordance with an applied link protection mode in response to the READ command. The method may comprise issuing a WRITE command by the host to the memory device over the link, and providing WRITE DATA by the host to the memory device over the link in accordance with the applied link protection mode upon issuing the WRITE command. The apparatus may be configured to implement a plurality of link protection modes including the first and second link protection modes. The link protection modes may be applied to protect at different levels of protection the READ DATA or the WRITE DATA transmitted over the link from errors.

Yet another exemplary apparatus is disclosed. The apparatus may comprise a host and a memory device configured to communicate with each other over a link. The memory device may comprise a plurality of memory cells. The memory device may comprise means for receiving a READ command from the host over the link, means for retrieving READ DATA from the plurality of memory cells in response to the READ command, and means for providing the READ DATA to the host over the link in accordance with an applied link protection mode in response to the READ command. Alternatively or in addition thereto, the memory device may comprise means for receiving a WRITE command from the host over the link, means for receiving WRITE DATA from the host over the link in response to the WRITE command, and means for storing the WRITE DATA to the plurality of memory cells in accordance with the applied link protection mode in response to the WRITE command. The host may comprise means for issuing the READ command to the memory device over the link, and means for receiving the READ DATA from the memory device over the link upon issuing the READ command. Alternatively or in addition thereto, the host may comprise means for issuing the WRITE command to the memory device over the link, and means for providing the WRITE DATA to the memory device over the link in accordance with the applied link protection mode upon issuing the WRITE command. The apparatus may be configured to implement a plurality of link protection modes including a first link protection mode and a second link protection mode. The link protection modes may be applied to protect at different levels of protection the READ DATA or the WRITE DATA transmitted over the link from errors. The apparatus may be configured to change from applying the first link protection mode to applying the second link protection mode in response to a link speed change.

BRIEF DESCRIPTION OF THE DRAWINGS

The accompanying drawings are presented to aid in the description of examples of one or more aspects of the disclosed subject matter and are provided solely for illustration of the examples and not limitation thereof:

FIG. 2 illustrates an example of a mode register used to implement a frequency set point register;

FIG. 3 illustrates an example of settings of frequency set point registers for different link speeds;

DETAILED DESCRIPTION

Figure 1:
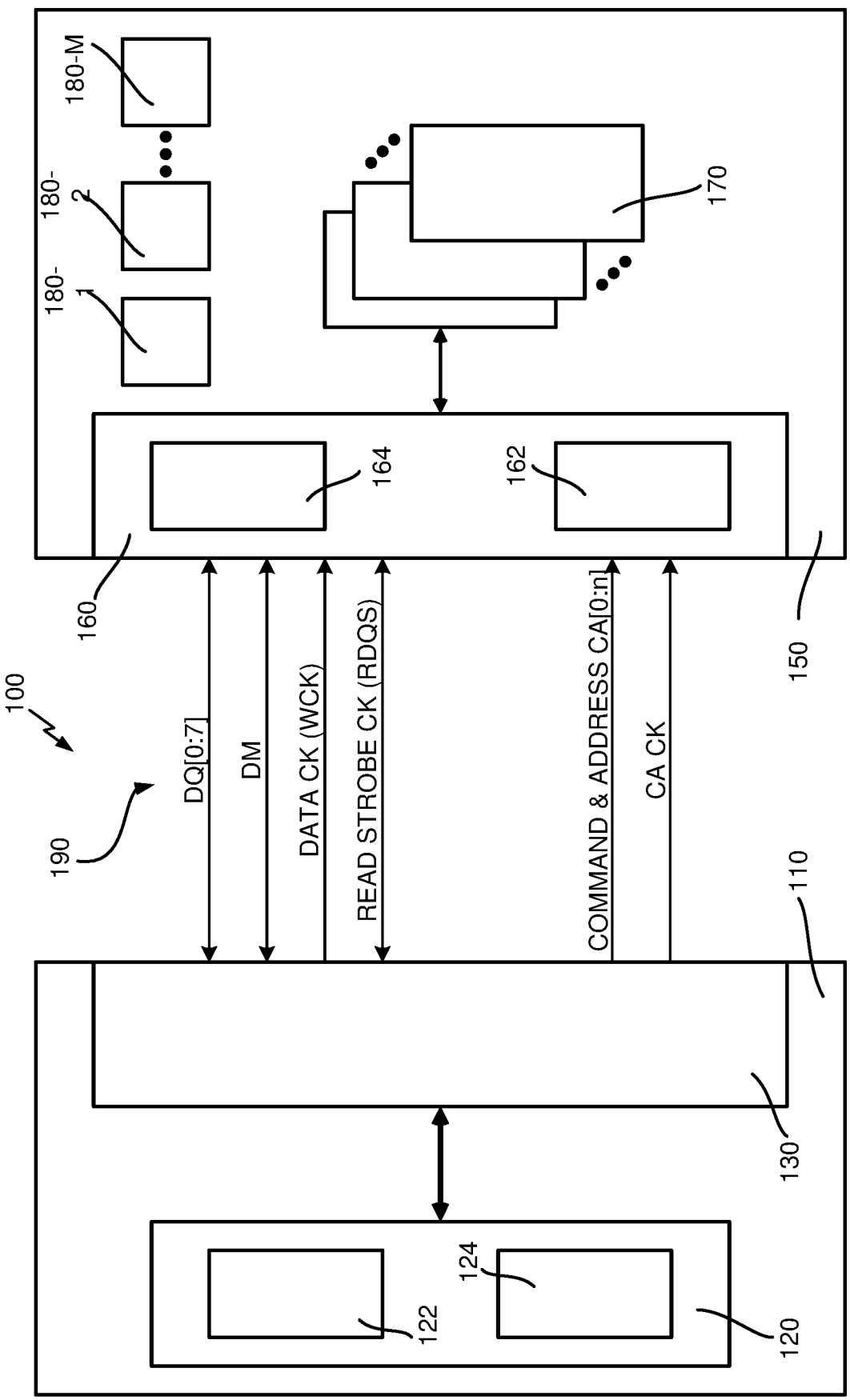
FIG. 1 illustrates a diagram of an example memory subsystem.

Aspects of the subject matter are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments of the disclosed subject matter include the discussed feature, advantage or mode of operation.

The terminology used herein is for the purpose of describing particular examples only and is not intended to be limiting. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, processes, operations, elements, and/or components, but do not preclude the presence or addition of one or more other features, integers, processes, operations, elements, components, and/or groups thereof.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects may be embodied in a number of different forms, all of which have been contemplated to be within the scope of the claimed subject matter. In addition, for each of the examples described herein, the corresponding form of any such examples may be described herein as, for example, "logic configured to" perform the described action.

One or more aspects of the disclosure may be applied to a low power memory subsystem in mobile or computing systems to protect high speed memory links (interfaces) with error detection and/or correction codes. For example, one or more aspects may be related with next generation low power DDR SPEC and DDR PHY in mobile or computing chipsets.

In one or more aspects, it is proposed to incorporate encoding and decoding capabilities (e.g., ECC, Hamming single-error-correct-double-error-detect (SECDED), parity, etc.) in both host and memory devices. Unlike conventional memory subsystems, it is proposed to include dynamic link error protection switching schemes that ranges from no link error protection to full link error protection and anywhere in between (i.e., partial link error protection). By incorporating the dynamic link error protection schemes into the memory device as well as into the host, some or all issues associated with the conventional techniques may be addressed. For example, the level of link error protection provided may be adjusted dynamically so that an optimum tradeoff between benefits and costs of providing link error protection may be made.

FIG. 1 illustrates an example of a proposed memory subsystem 100 that provides a dynamic link error protection. The memory subsystem 100 may include a system-on-chip (SoC) 110 and a memory device 150 communicating over a link 190. This is a simplified illustration in that a single memory device 150 is shown. However, a single SoC 110 may communicate with multiple memory devices 150. In some examples, the SoC 110 may be a processor or application processor for a mobile device. The SoC 110 may be referred to as a host 110 for providing memory commands to the memory devices 150.

In some examples, the link 190 may provide a chip-to-chip link between the host 110 and the memory devices 150. For example, the link 190 may comprise a plurality of signal lines including lines to transmit unidirectional signals from the host 110 to the memory devices 150 (e.g., clock (CK), chip select (CS), command & address (CA), etc.) and bidirectional directional signals (data (DQ), data strobe (DQS), etc.). The signaling between the host 110 and the memory devices 150 may be in accordance with the JEDEC DRAM specification.

The host 110 may include a memory controller 120, a host link interface 130 (e.g., memory PHY block), a host encoder 122, and a host decoder 124. While not illustrated, the host 110 may also include other components such as digital signal processors (DSP), graphics processing units (GPU), multi-media engines, and multi-core central processing units (CPU) that send read and write requests to the memory controller 120.

The memory controller 120 may issue READ and WRITE commands to the memory device 150 through the host link interface 130, e.g., to fulfill the requests received from DSPs, GPUs, etc. When the memory controller 120 issues the READ command, it may receive READ DATA from the host link interface 130, and in turn send the READ DATA to the requestor. When the memory controller 120 issues the WRITE command, it may receive WRITE DATA from the requestor, and in turn provide the WRITE DATA to the host link interface 130.

During a read operation, the host link interface 130 may send the READ command on behalf of the memory controller 120 to the memory device 150 over the link 190. Subsequently, the host link interface 130 may receive the READ DATA from the memory device 150 over the link 190, and provide the received READ DATA to the memory controller 120. The READ DATA may be encoded or unencoded. If the READ DATA is encoded, the host decoder 124 may decode the READ DATA, and the memory controller 120 may send the decoded READ DATA to the requestor. The host decoder 124 may also detect and even correct errors that may be present in the READ DATA. For example, the host decoder 124 may correct one or more bit errors that may be introduced in the transmission of the READ DATA. The memory controller 120 may be configured to send the corrected READ DATA back to the requestor.

During a write operation, the host link interface 130 may send the WRITE command and the WRITE DATA on behalf of the memory controller 120 to the memory device 150 over the link 190. When enabled, the host encoder 122 (e.g., ECC, Hamming SECDEC, parity, etc.) may encode the WRITE DATA such that the encoded WRITE DATA is sent over the link 190. Encoding the WRITE DATA allows the memory device 150 to detect and even to correct errors that may be present in the WRITE DATA. For example, one or more bit errors introduced in the transmission of the WRITE DATA over the link 190 may be corrected.

In FIG. 1, the host encoder 122 and the host decoder 124 are illustrated as being incorporated into the memory controller 120. This is merely an example, and should not be taken to be limiting. It is contemplated that the host encoder 122 and/or the host decoder 124 may be on their own or incorporated into other components within the host 110 such as the host link interface 130. Also, while the host encoder 122 and the host decoder 124 are individually illustrated, the two may be implemented in a single device. It is also contemplated that the host encoder 122 and/or the host decoder 124 may be implemented in multiple devices. Indeed, in some aspect(s), the implementation of the host encoder 122 and/or the host decoder 124 may be spread among multiple components within the host 110.

The memory device 150 may include a memory link interface 160 (e.g., an input/output (I/O) block), one or more memory banks 170, a memory encoder 162, and a memory decoder 164. The memory banks 170 may include a plurality of memory cells. The memory link interface 160 may receive the READ and WRITE commands from the host 110 over the link 190. When the memory link interface 160 receives the READ command, it may provide the READ DATA to the host 110. When the memory link interface 160 receives the WRITE command, it may also receive the WRITE DATA from the host 110.

During the read operation, the memory link interface 160 may receive the READ command from the host 110 over the link 190. In response to the READ command, the memory link interface 160 may retrieve the READ DATA from the plurality of memory cells in the memory banks 170 and provide the retrieved READ DATA to the host 110 over the link 190. When enabled, the memory encoder 162 may encode the READ DATA such that the encoded READ DATA is sent over the link 190. Encoding the READ DATA allows the host 110 to detect and even to correct errors that may be present in the READ DATA.

During the write operation, the memory link interface 160 may receive the WRITE command and the WRITE DATA from the host 110 over the link 190. The memory link interface 160 may store the WRITE DATA in the memory banks 170, i.e., in the plurality of memory cells, in response to the WRITE command. The WRITE DATA may be encoded or unencoded. If the WRITE DATA is encoded, the memory decoder 164 may decode the WRITE DATA, and the memory link interface 160 may store the decoded WRITE DATA in the memory banks 170. The memory decoder 164 may also detect and even correct errors that may be present in the WRITE DATA, and the memory link interface 160 may store the corrected WRITE DATA in the memory banks 170.

In FIG. 1, the memory encoder 162 and the memory decoder 164 are illustrated as being incorporated into the memory link interface 160. This is merely an example, and should not be taken to be limiting. It is contemplated that the memory encoder 162 and/or the memory decoder 164 may be on their own or incorporated into other components within the memory device 150. Also, while the memory encoder 162 and the memory decoder 164 are individually illustrated, the two may be implemented in a single device. It is also contemplated that the memory encoder 162 and/or the memory decoder 164 may be implemented in multiple devices. Indeed, in some aspect(s), the implementation of the memory encoder 162 and/or the memory decoder 164 may be spread among multiple components.

In an aspect, the host encoder 122 and the memory encoder 162 may operate to generate identically encoded WRITE DATA and READ DATA (e.g., same ECC) when provided with identical unencoded data. In another aspect, it is also possible that the WRITE DATA can be encoded differently from the READ DATA. However, as long as the memory and host decoders 164, 124 respectively operate complimentarily to the host and memory encoders 122, 162, proper data exchange can take place.

As indicated above, it is proposed to incorporate dynamic link error protection switching capabilities into the memory subsystem 100. In one aspect, the proposed technique enables the level of link error protection to be adjusted dynamically so that an appropriate amount of protection can be provided based on the operation environment. For example, a probability of link errors can be strongly correlated with the operating speed on the link 190. Thus, the level of link error protection may be dynamically adjusted based on a link speed. That is, when the link speed of the memory subsystem 100 changes, the level of link error protection may also change appropriately. The level of link error protection may range anywhere between no protection and full protection.

For ease of discussion, it will be assumed that the memory subsystem 100 may implement a plurality of link protection modes that can be applied to protect against errors on the link 190. For example, each link protection mode may include a plurality of protection parameters and define a level of protection applied to protect the READ DATA and the WRITE DATA transmitted over the link 190 from errors. Then when the link speed changes from a first link speed to a second link speed, the memory subsystem 100 can change from applying a first link protection mode to applying a second link protection mode. In other words, the applied link protection changes.

Recall that one or both of the READ DATA and the WRITE DATA may be encoded. Encoding the READ DATA at the memory device 150 allows the host 110 to detect and/or correct any errors in the READ DATA transmitted over the link 190. Conversely, encoding WRITE DATA at the host 110 allows the memory device 150 to detect and/or correct any errors in the WRITE DATA transmitted over the link 190. Therefore, in an aspect, each link protection mode may specify whether each of a read-error-detect parameter, a read-error-correct parameter, a write-error-detect parameter, and a write-error-correct parameter is enabled/disabled. The read-error-detect parameter may be a protection parameter to indicate whether error(s) in the READ DATA should be detected, the read-error-correct parameter may be a protection parameter to indicate whether error(s) in the READ DATA should be corrected, the write-error-detect parameter may be a protection parameter to indicate whether error(s) in the WRITE DATA should be detected, and the write-error-correct parameter may be a protection parameter to indicate whether error(s) in the WRITE DATA should be corrected. In this aspect, each link protection mode may specify different combinations of the protection parameters being enabled/disabled.

Example scenarios are provided to enable a more detailed understanding. Assume that in a first example scenario, the memory subsystem 100 is a low power double data rate 5 (LPDDR5) memory subsystem with a data clock (WCK) that can operate in frequencies ranging between 20 Mhz-3.2 Ghz, which translates to link transfer speeds that range between 40 Mbps-6400 Mbps. If the link 190 is operating at a low speed (e.g., WCK at or below 1.6 Ghz), the chances of transmission errors occurring on the link 190 may be low enough such that unencoded data (READ DATA, WRITE DATA) can be transmitted with sufficient reliability. In such operating environments where unencoded data can be reliably transmitted, implementing link error protection may provide, at best, only a marginal improvement in the transmission reliability such that the costs of implementing link error protection may outweigh the benefits.

Thus, in a low link speed environment under the first example scenario, the protection may be completely turned off, i.e., completely disabled. For example, the link protection mode corresponding to the low link speed may specify that all of the protection parameters—the read-error-detect parameter, the read-error-correct parameter, the write-error-detect parameter, and the write-error-correct parameter—are disabled. If the low speed link protection mode is the applied link protection mode, the host encoder 122, the host decoder 124, the memory encoder 162, and the memory decoder 164 may all be disabled, and unencoded READ DATA and WRITE DATA may be transmitted over the link 190. By disabling the host encoder 122, the host decoder 124, the memory encoder 162, and the memory decoder 164, the power and latency penalties can be avoided.

At the other extreme, if the link 190 is operating at a high speed (e.g., WCK above 1.6 Ghz), the chances of transmission errors occurring on the link 190 can be such that unencoded data is unlikely to be transmitted over the link 190 with sufficient reliability. In such operating environments where unencoded data cannot be reliably transmitted over the link 190, implementing link error protection may improve the transmission reliability so as to justify the costs (e.g., overhead, power, etc.).

Thus, in a high link speed environment under the first example scenario, the link error protection may be fully enabled. For example, the high speed link protection mode may specify that all protection parameters—the read-error-detect parameter, the read-error-correct parameter, the write-error-detect parameter, and the write-error-correct parameter—be enabled. If this high speed link protection mode is the applied link protection mode, then for read operations, the memory encoder 162 may be enabled to encode the READ DATA provided over the link 190, and the host decoder 124 may be enabled to decode the encoded READ DATA. In an aspect, the host decoder 124 may be enabled to detect whether there are any errors (e.g., bit errors) in the encoded READ DATA. The decoded READ DATA may be provided to a requestor if no errors are detected. In another aspect, even when there are errors in the encoded READ DATA, the host decoder 124 may be enabled to correct the errors such that the corrected READ DATA can be provided to the requestor. The host decoder 124 may correct up to a certain number—a read threshold number—of errors.

For write operations when the applied link protection mode is the high speed link protection mode, the host encoder 122 may be enabled to encode the WRITE DATA provided over the link 190, and the memory decoder 164 may be enabled to decode the encoded WRITE DATA such that the decoded WRITE DATA is stored in the plurality of memory cells of the memory banks 170. In an aspect, the memory decoder 164 may be enabled to detect whether there are any errors (e.g., bit errors) in the encoded WRITE DATA. The decoded WRITE DATA may be stored if no errors are detected. In another aspect, even when errors are detected, the memory decoder 164 may be enabled to correct the errors such that the corrected WRITE DATA can be stored. The memory decoder 164 may correct up to a certain number—a write threshold number—of errors. The read and write threshold numbers may be the same or different.

In this first example scenario, two link protection modes—e.g., low and high speed link protection modes—are described. In an aspect, the link protection modes may be implemented in the memory device 150 through frequency set point (FSP) registers. Then for the first example scenario, two FSP registers—FSP[0] and FSP[1]—may be utilized.

Details regarding the FSP registers will be provided below when FIGS. 2 and 3 are described.

While only two link protection modes are discussed in the first example scenario, there can be any number of link protection modes. For illustration, assume that in a second example scenario, there are three link protection modes—low, middle, and high speed link protection modes respectively corresponding to a low speed range (e.g., 20 Mhz≤WCK frequency≤1.33 Ghz), a middle speed range (e.g., 1.33 Ghz<WCK frequency≤2.66 Ghz), and a high speed range (e.g., 2.66 Ghz<WCK frequency≤3.2 Ghz).

Also assume that for the low speed link protection mode in this second example scenario, all of the read-error-detect parameter, the read-error-correct parameter, the write-error-detect parameter, and the write-error-correct parameter are disabled. Thus, when the link 190 operates at a speed within the low speed range (e.g., 1 Ghz), the low speed link protection mode becomes the applied link protection mode, and none of the host encoder 122, the host decoder 124, the memory encoder 162, and the memory decoder 164 are enabled. Therefore, unencoded READ and WRITE DATA may be transferred over the link 190 when the low speed link protection mode is applied.

Further assume that for the high speed link protection mode, all of the read-error-detect parameter, the read-error-correct parameter, the write-error-detect parameter, and the write-error-correct parameter are enabled. Thus, when the link 190 operates at a speed within the high speed range (e.g., 3 Ghz), the high speed link protection mode becomes the applied link protection mode, and all of the host encoder 122, the host decoder 124, the memory encoder 162, and the memory decoder 164 are enabled for detection as well as correction. Therefore, encoded READ and WRITE DATA are transferred over the link 190 when the high speed link protection mode is applied.

As described above, the low and high speed link protection modes of the second example scenario are similar to the low and high speed link protection modes of the first example scenario. But unlike the first example scenario, the second example scenario also includes a middle speed link protection mode in which it may be assumed that the read-error-detect parameter is disabled, the read-error-correct parameter is enabled, the write-error-detect parameter disabled, and the write-error-correct parameter is enabled. Thus, when the link 190 operates at a speed within the middle speed range (e.g., 2 Ghz), the middle speed link protection mode becomes the applied link protection mode. In this mode, the memory encoder 162 encodes the READ DATA and the host encoder 122 encodes the WRITE DATA. Complimentarily, the host decoder 124 corrects up to the read threshold number of bit errors in the READ DATA, and the memory decoder 164 corrects up to the write threshold number of bit errors in the WRITE DATA.

When the middle speed link protection mode is applied, the read and write latencies can increase relative to the low speed link protection mode. Power consumption may also be higher. However, relative to the high speed link protection mode, less power can be consumed since error detection is disabled.

Note that the error detection may be separated from error correction. That is, the read-error-detect parameter may be enabled/disabled separately from the read-error-correct parameter. Likewise, and the write-error-detect parameter may be enabled/disabled separately from the write-error-correct parameter. In short, each protection parameter may be independently enabled and disabled. As a result, many combinations of levels of enablement of the host encoder 122, the host decoder 124, the memory encoder 162, and the memory decoder 164 are possible, which allows fine tuning of the plurality of link protections modes.

In both the first and second example scenarios, applying the low speed link protection mode implies disabling all link error protection features, and applying the high speed link protection mode implies enabling all link error protection features. However, there may be circumstances where some minimal protection may be desirable, even at low link speeds. There may also be circumstances where full protection is not desirable, even at the highest link speed.

For example, assume that in a third example scenario, there are three link protection modes and the low and middle speed link protection modes are the same as the second example scenario. But the high speed link protection mode differs from that of the second example scenario in that the write-error-detect parameter is disabled. Such a link protection mode may be applicable where multiple link errors are detected in a write operation. In such situations, the host 110 (e.g., SoC) may retry the same write operation to the memory device 150 to recover the original WRITE DATA. Unfortunately, this can require significant implementation complexities and incur large performance losses by the write retry. In this instance, enabling link error correction only for writes may be a trade-off between performance loss by the write retries and better link error protection capability.

Of course, it is entirely possible to incorporate the high speed link protection mode of the third example scenario in between the high and middle speed link protection modes of the second example scenario. In general, the host 110 and the memory device 150 may be configured to implement a plurality of link protections modes. The link protection modes may be different from each other. Each link protection mode may correspond to a link speed. The link speed corresponding to one link protection mode may be different from the link speeds corresponding to other link protection modes. More broadly, each link protection mode may correspond to a range of link speeds, and the range of link speeds corresponding to one link protection mode may be non-overlapping with the ranges of links speeds corresponding to other link protection modes.

Each link protection mode may include a plurality of protection parameters used to define a particular level of protection applied to protect the READ DATA and the WRITE DATA transmitted over the link 190 from errors. For example, each link protection mode may define a particular combination of levels of enablement of the host encoder 122, the host decoder 124, the memory encoder 162, and the memory decoder 164. Moreover, each link protection mode may be different from each of the other link protection modes. For example, the combination of levels of enablement defined for one link protection mode may differ from the combinations defined for other link protection modes. In this way, when the link speed changes—e.g., from a first link speed to a second link speed, the link protection mode may also change dynamically—e.g., from a first link protection mode (corresponding to the first link speed) to a second link protection mode (corresponding to the second link speed).

Recall that in the memory device 150, frequency set point (FSP) registers may be utilized to implement the link protection modes. The memory device 150 may include a plurality of FSP registers corresponding to the plurality of link protection modes. The FSP registers may be, for example, registers or other storage elements. For the first example scenario, the memory device 150 may include at least two FSP registers FSP[0] (e.g., for the low speed link protection mode) and FSP[1] (e.g., for the high speed link protection mode). For the second and third example scenarios, the memory device 150 may include at least three FSP registers FSP[0] (e.g., for the low speed link protection mode), FSP[1] (e.g., for the middle speed link protection mode) and FSP[2] (e.g., for the high speed link protection mode).

In an aspect, to the extent that each link protection mode corresponds to a speed or a range of speeds, one implication is that each FSP register also corresponds to the link speed or the range of link speeds. Each FSP register may reflect the combination of the read-error-detect, the read-error-correct, the write-error-detect, and the write-error-correct protection parameters of the corresponding link protection mode. For example, each FSP register may comprise a plurality protection bits including a read-error-detect bit, a read-error-correct bit, a write-error-detect bit, and a write-error-correct bit. The read-error-detect bit, when set/unset, may indicate that the read-error-detect parameter is enabled/disabled. The read-error-correct bit, when set/unset, may indicate that the read-error-correct parameter is enabled/disabled. The write-error-detect bit, when set/unset, may indicate that the write-error-detect parameter is enabled/disabled. The write-error-correct bit, when set/unset, may indicate that the write-error-correct parameter is enabled/disabled.

In an aspect, the plurality of FSP registers may be implemented through one or more mode registers (MR) 180-1 ... 180-M. As seen in FIG. 1, the memory device 150 may include a plurality of mode registers 180-1 ... 180-M. The mode registers 180-1 ... 180-M may define the behavior of the memory device 150. There may be M mode registers 180-1 ... 180-M, where M may be any integer greater than zero. Each mode register 180-1 ... 180-M may be a write type, a read type, or a read/write type. The memory controller 120 may issue a mode register write (MRW) command to designate a particular write or read/write type mode register along with a mode value, and the memory link interface 160 may write the received mode value to the designated mode register 180-1 ... 180-M. The memory controller 120 may also issue a mode register read (MRR) command to designate a particular read or read/write type mode register, and the memory link interface 160 may read from the designated mode register 180-1 ... 180-M and provide the read value to the memory controller 120.

FIG. 2 illustrates an example of a mode register, such as one of the mode registers 180-1 ... 180-M, that may be used to implement the FSP register. In this example, it is assumed that the mode register for the FSP register comprises eight operand (OP) bits in which bits OP[3], OP[2], OP[1] and OP[0] respectively are utilized to implement the read-error-detect bit, the read-error-correct bit, the write-error-detect bit, and the write-error-correct bit to reflect the protection parameters. For each mode register used to implement the FSP register, the memory controller 120 may issue an MRW command along with a corresponding mode value. In turn, the memory link interface 160 may write the corresponding mode value to that mode register. In this way, different combinations of the read-error-detect bit, the read-error-correct bit, the write-error-detect bit, and the write-error-correct bit may be set/unset to reflect the different link protection modes.

FIG. 3 illustrates an example of settings of the FSP registers for different link speeds. In this particular example, three mode registers are used to implement the three FSP registers FSP[0], FSP[1] and FSP[2]. The settings in these FSPs reflect the third example scenario described above.

Figure 4:
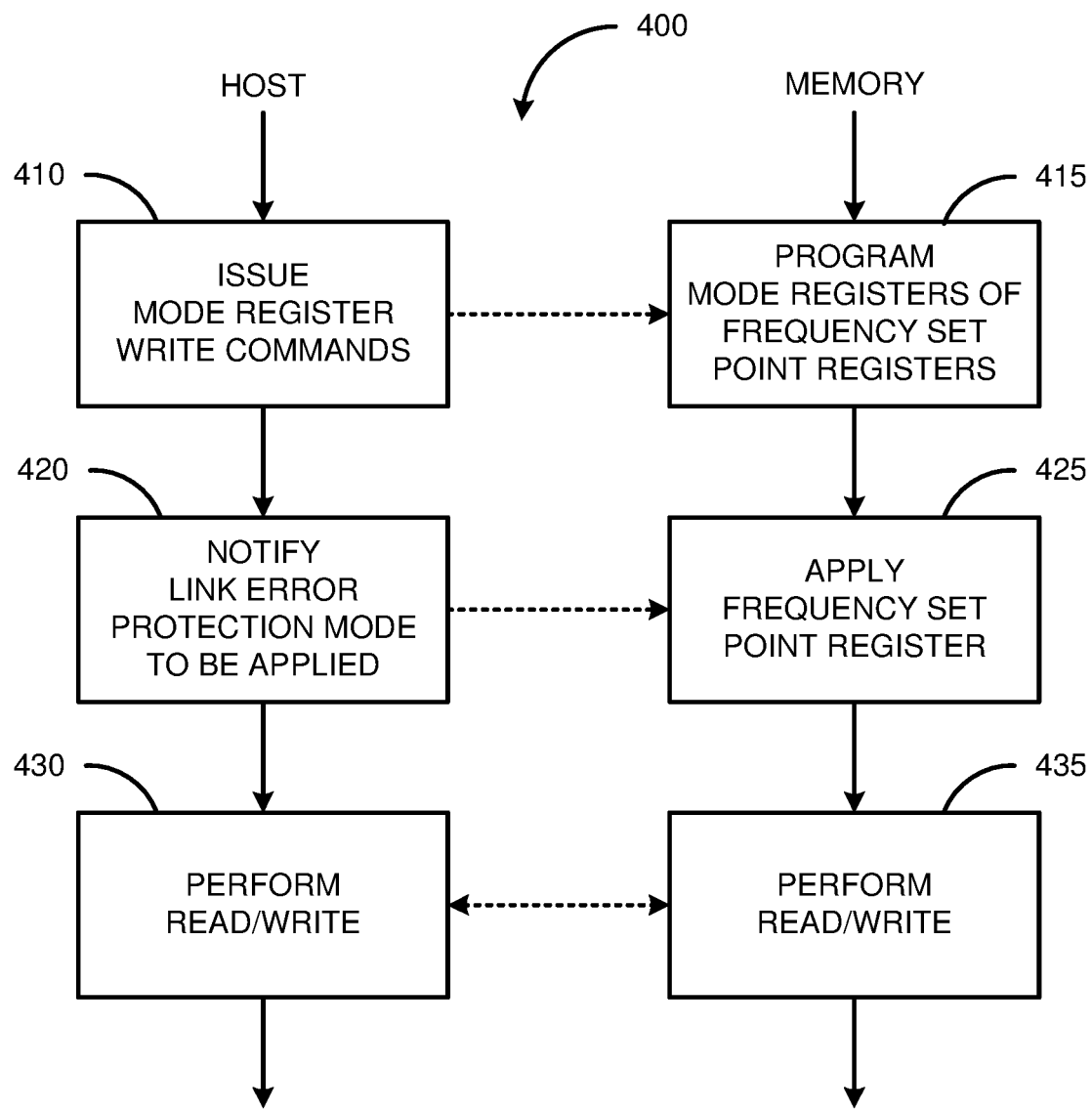
FIG. 4 illustrates a flow chart of an example method to dynamically change a link protection mode.

FIG. 4 illustrates a flow chart of an example method 400 to perform to dynamically change the link protection mode in the memory subsystem 100. In FIG. 4, the host 110 may perform the even-numbered blocks 410-430, and the memory device 150 may perform the odd-numbered blocks 415-435. In block 410, the host 110 (e.g., the memory controller 120) may issue the MRW commands along with mode values to the memory device 150, e.g., over the link 190. In block 415, the memory device 150 (e.g., the memory link interface 160) may program the mode registers 180 used to implement the FSP registers with the mode values received from the host 110. In block 420, the host 110 may notify the memory device 150 of the link protection mode to be applied. In one aspect, when the link speed changes from the first link speed to the second link speed, the host 110 may indicate to the memory device 150 of the change in the link protection mode to be applied from the first link protection mode to the second link protection mode. For example, the host 110 may indicate to the memory device 150 the current FSP register that corresponds to the second link protection mode. In block 425, the memory device 150 may apply the current FSP register. In blocks 430 and 435, the host 110 and the memory device 150 may coordinate to perform the read and write operations in accordance with the second link protection mode.

Figure 5:
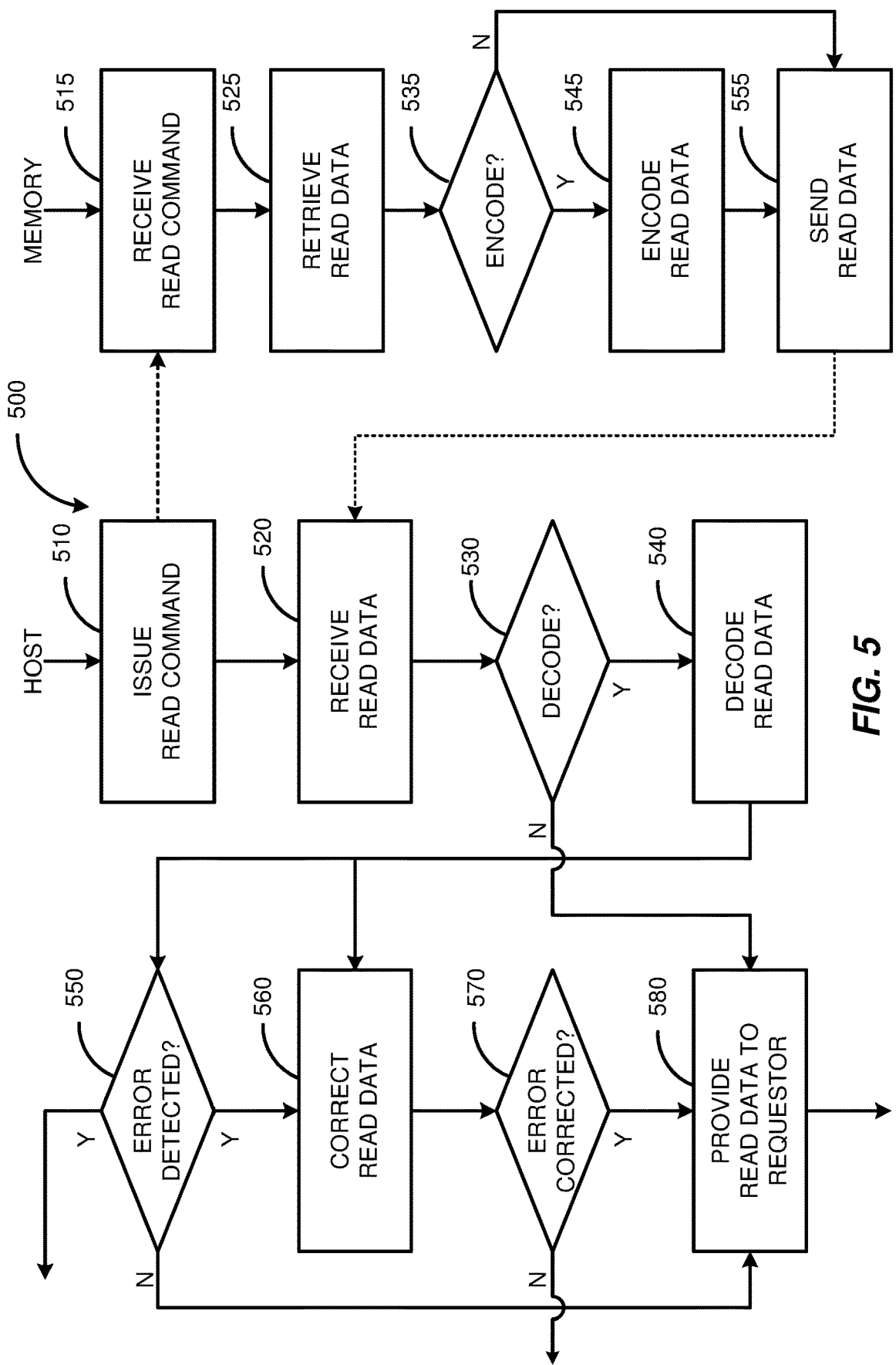
FIG. 5 illustrates a flow chart of an example method to perform a read operation.

FIG. 5 illustrates a flow chart of an example method 500 to perform the read operation. The host 110 may perform the even-numbered blocks 510-580, and the memory device 150 may perform the odd-numbered blocks 515-555. In block 510, the memory controller 120 may issue the READ command to the memory device 150 over the link 190. For example, the memory controller 120 may be reacting to a read request from a requestor (e.g., DSPs, GPUs, CPUs, etc.). Subsequently, in block 520, the memory controller 120 may receive the READ DATA from the memory device 150 over the link 190.

In between blocks 510 and 520, the memory link interface 160 may receive the READ command in block 515. In block 525, the memory link interface 160 may retrieve the READ DATA from the plurality of memory cells. In block 535, the memory device 150 may determine whether the READ DATA should be encoded. In an aspect, the READ DATA may be encoded when one or both of the read-error-detect bit and the read-error-correct bit of the current FSP register are set. This may be viewed as being equivalent to determining to encode the READ DATA when one or both of the read-error-detect parameter and the read-error-correct parameter of the applied link protection mode are enabled.

If it is determined that encoding the READ DATA is not necessary (e.g., if both the read-error-detect and read-error-correct protection bits are unset (i.e., disabled)), then in block 555, the memory link interface 160 may send the retrieved READ DATA over the link 190 without encryption. On the other hand, if it is determined that the READ DATA should be encoded (e.g., if one or both protection bits are set (i.e., enabled)), then in block 545, the memory encoder 162 may encode the retrieved READ DATA, and then in block 555, the memory link interface 160 may send the encoded READ DATA over the link 190.

Back on the host side, in block 530, the host 110 may determine whether the READ DATA received over the link 190 should be decoded. For example, since the memory device 150 encodes the READ DATA when one or both of the read-error-detect and read-error-correct parameters of the applied link protection mode are enabled, the host 110 may determine that the READ DATA should be decoded also when one or both of the read-error-detect and the read-error-correct parameters of the applied link protection mode are enabled. When it is determined that the received READ DATA is not encoded (e.g., if both parameters are disabled), the memory controller 120 may provide the READ DATA without decryption to the requestor in block 580.

However, if in block 530 it is determined that the received READ DATA is encoded and therefore should be decoded, then in block 540, the host decoder 124 may decode the received READ DATA. From block 540, if the read-error-detect parameter of the applied link protection mode is enabled, the method may proceed to block 550. In this block, the host 110 may detect whether there are any errors in the received READ DATA. If no errors are detected, the memory controller 120 may provide the decoded READ DATA to the requestor in block 580.

However, if any errors are detected in block 550, other options may be taken (e.g., "Y" branch exiting from top). One option may be to do nothing, and the requestor may try the same request again after some timeout. Another option may be to report an error to the requestor. Yet another option may for the memory controller 120 to resend the READ command to the memory device 150. These are merely examples, and are not meant to be exhaustive.

Alternatively from block 540, if the read-error-correct parameter of the applied link protection mode is enabled, then the method 500 may proceed to block 560. In this block, the host decoder 124 may correct any errors that may be present in the READ DATA. In an aspect, it should be noted that it is not necessary to determine whether there are errors before applying a correction process. That is, the correction process may be such that it does not introduce any additional errors. Thus, an error free READ DATA can remain error free after the correction process is applied.

In block 570, the host 110 may determine whether the READ DATA has been fully corrected. For example, there may be a limit to how many bit errors that the host decoder 124 can correct. In other words, the host decoder 124 may be capable of correcting up to a "read threshold" number of bit errors in the READ DATA. If it is determined that the READ DATA has been corrected (e.g., the number of errors is less than the read threshold number), then in block 580, the memory controller 120 may provide the corrected READ DATA to the requestor.

However, if it is determined that the READ DATA has not been fully corrected (e.g., the number of error may exceed the read threshold number) in block 570, then other options may be taken (e.g., "N" branch exiting from left side). The options may be similar to the options listed with reference to block 550.

In another alternative from block 540, both of the read-error-detect and read-error-correct protection parameters may be enabled. Since the read-error-detect parameter is enabled, the method may proceed to block 550 in which the host 110 may detect whether there are any errors in the received READ DATA. As described above, the memory controller 120 may provide the decoded READ DATA to the requestor in block 580 when no errors are detected in block 550. However, in this instance, if errors are detected in block 550, the method may proceed to block 560 in which the host decoder 124 may correct the errors (e.g., up to the read threshold number). This is because the read-error-correct protection parameter is also enabled.

Figure 6:
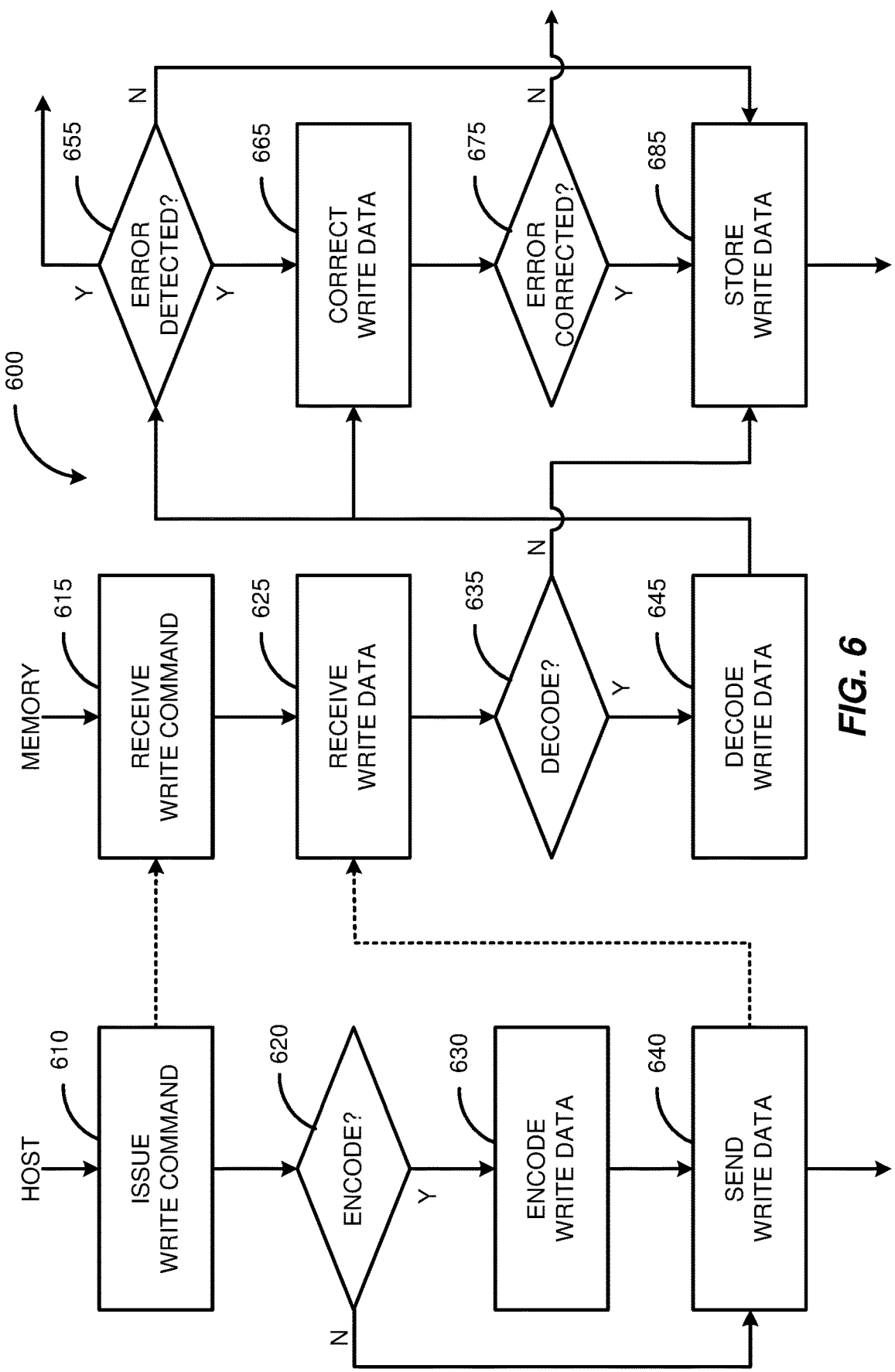
FIG. 6 illustrates a flow chart of an example method to perform a write operation.

FIG. 6 illustrates a flow chart of an example method 600 to perform the write operation. The host 110 may perform the even-numbered blocks 610-640, and the memory device 150 may perform the odd-numbered blocks 615-685. In block 610, the memory controller 120 may issue the WRITE command to the memory device 150 over the link 190. For example, the memory controller 120 may be reacting to a write request from a requestor (e.g., DSPs, GPUs, CPUs, etc.).

In block 620, the host 110 may determine whether the WRITE DATA (e.g., also received in the requestor's write request) to be should be encoded before it is provided to the memory device 150. In an aspect, it may be determined that the WRITE DATA should be encoded when one or both of the write-error-detect and the write-error-correct parameters of the applied link protection mode are enabled.

If it is determined that encoding the WRITE DATA is not necessary (e.g., if both the read-error-detect and read-error-correct protection parameters are disabled), then in block 640, the memory link interface 160 may send the WRITE DATA over the link 190 without encryption. On the other hand, if it is determined that the WRITE DATA should be encoded (e.g., if one or both protection parameters are enabled), then in block 630, the host encoder 122 may encode the WRITE DATA, and then in block 640, the host link interface 130 may send the encoded WRITE DATA over the link 190.

In blocks 615 and 625, the memory link interface 160 may respectively receive the WRITE command and the WRITE DATA from the host 110 over the link 190. In block 635, the memory device 150 may determine whether the WRITE DATA received over the link 190 should be decoded. For example, since the host 110 encodes the WRITE DATA when one or both of the write-error-detect and the write-error-correct parameters of the applied link protection mode are enabled, the memory device 150 may determine that the received WRITE DATA should be decoded also when one or both of the write-error-detect and the write-error-correct parameters of the applied link protection mode are enabled. When it is determined that the received WRITE DATA is not encoded, the memory link interface 160 may store the WRITE DATA in the plurality of memory cells in block 685.

However, if in block 635, it is determined that the received WRITE DATA is encoded and therefore should be decoded, then in block 645, the memory decoder 164 may decode the received WRITE DATA. From block 645, if the write-error-detect parameter of the applied link protection mode is enabled, the method may proceed to block 655. In this block, the memory device 150 may determine whether there are any errors in the received WRITE DATA. If no errors are detected, the memory link interface 160 may store the decoded WRITE DATA in the plurality of memory cells in block 685.

However, if any errors are detected in block 655, other options may be taken (e.g., "Y" branch exiting from top). One option may be to do nothing, and the host 110 may try again after some timeout. Another option may be to report an error to the host 110. These are merely examples, and are not meant to be exhaustive.

Alternatively from block 645, if the write-error-correct parameter of the applied link protection mode is enabled, then the method 600 may proceed to block 665. In this block, the memory decoder 164 may correct any errors that may be present in the WRITE DATA. Again, it should be noted that it is not necessary to determine whether there are errors before applying a correction process.

In block 675, the memory device 150 may determine whether the WRITE DATA has been fully corrected. For example, the memory decoder 164 may be capable of correcting up to a "write threshold" number of bit errors in the WRITE DATA. If it is determined that the WRITE DATA has been corrected (e.g., the number of errors is less than the write threshold number), then in block 685, the memory link interface 160 may store the corrected WRITE DATA in the plurality of memory cells.

However, if it is determined that the WRITE DATA has not been fully corrected (e.g., the number of errors may exceed the write threshold number) in block 675, then other options may be taken (e.g., "N" branch exiting from right side). The options may be similar to the options listed with reference to block 655.

In another alternative from block 645, both of the write-error-detect and write-error-correct protection parameters may be assumed to be enabled. Since the write-error-detect parameter is enabled, the method may proceed to block 655 in which the memory device 150 may detect whether there are any errors in the received WRITE DATA, and the memory link interface 160 may store the decoded WRITE DATA in block 685 when no errors are detected in block 655. However, in this instance, if errors are detected in block 655, the method may proceed to block 665 in which the memory decoder 164 may correct the errors since the write-error-correct protection parameter is also enabled.

Figure 7:
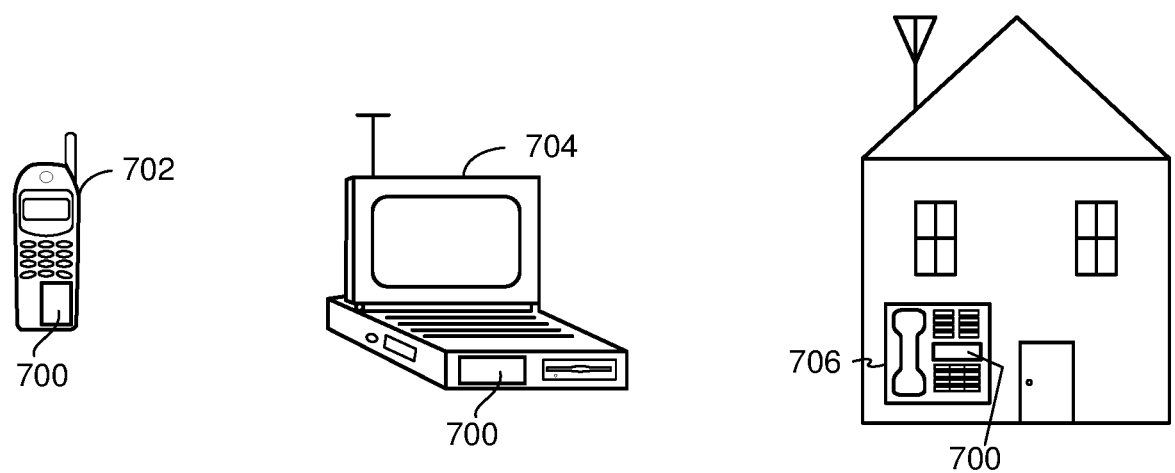
FIG. 7 illustrates examples of devices with a memory subsystem integrated therein.

FIG. 7 illustrates various electronic devices that may be integrated with the aforementioned memory subsystem 100. For example, a mobile phone device 702, a laptop computer device 704, a terminal device 706 as well as wearable devices, portable systems, that require small form factor, extreme low profile, may include a device/package 700 that incorporates the memory subsystem 100 as described herein. The device/package 700 may be, for example, any of the integrated circuits, dies, integrated devices, integrated device packages, integrated circuit devices, device packages, integrated circuit (IC) packages, package-on-package devices, system-in-package devices described herein. The devices 702, 704, 706 illustrated in FIG. 7 are merely exemplary. Other electronic devices may also feature the device/package 700 including, but not limited to, a group of devices (e.g., electronic devices) that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices, servers, routers, electronic devices implemented in automotive vehicles (e.g., autonomous vehicles), or any other device that stores or retrieves data or computer instructions, or any combination thereof.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithms described in connection with the examples disclosed herein may be implemented as electronic hardware, computer software, or combinations of both. To clearly illustrate this interchangeability of hardware and software, various illustrative components, blocks, modules, circuits, and methods have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled with the processor such that the processor can read information from, and write information to, the storage medium. In the alternative, the storage medium may be integral to the processor.

Accordingly, an aspect can include a computer-readable media embodying any of the devices described above. Accordingly, the scope of the disclosed subject matter is not limited to illustrated examples and any means for performing the functionality described herein are included.

While the foregoing disclosure shows illustrative examples, it should be noted that various changes and modifications could be made herein without departing from the scope of the disclosed subject matter as defined by the appended claims. The functions, processes and/or actions of the method claims in accordance with the examples described herein need not be performed in any particular order. Furthermore, although elements of the disclosed subject matter may be described or claimed in the singular, the plural is contemplated unless limitation to the singular is explicitly stated.

What is claimed is:

1. An apparatus, comprising:
   a memory configured to communicate with a host over a link, the memory comprising:
   a mode register corresponding to a link speed and comprising a plurality of operands to indicate write link error correction code disable or write link error correction code enable, and to indicate read link error correction code disable or read link error correction code enable,
   wherein the mode register is one of a plurality of mode registers of the memory, the plurality of mode registers corresponding to different link speeds.

2. The apparatus of claim 1, wherein the memory is configured to receive a mode register write command to program the mode register.

3. The apparatus of claim 2, wherein the mode register comprises two bits to indicate the write error correction code disable or the write error correction code enable and two bits to indicate the read error correction code disable or the read error correction code enable.

4. The apparatus of claim 2, wherein the plurality of mode registers corresponds to three link speeds, including a high speed and a low speed.

5. The apparatus of claim 2, further comprising the host and the link.

6. The apparatus of claim 5, wherein the host is configured to issue the mode register write command over the link to program the plurality of mode registers.

7. The apparatus of claim 6, wherein the host indicates to the memory a protection mode to be applied by notifying the memory one of the plurality of mode registers corresponding to the protection mode, when the link speed changes.

8. The apparatus of claim 7, wherein the apparatus is incorporated into a device selected from a group consisting of a music player, a video player, an entertainment unit, a navigation device, a communication device, a mobile device, a mobile phone, a smartphone, a personal digital assistant, a fixed location terminal, a table computer, a computer, a wearable device, a laptop computer, a server, and a device in an automotive vehicle.

9. The apparatus of claim 1, wherein a combination of the write error correction code disable or write error correction code enable and the read error correction code disable or the read error correction code enable indicated by the plurality of operands of the mode register is different from a combination of the write error correction code disable or write error correction code enable and the read error correction code disable or the read error correction code enable indicated by the plurality of operands of any other mode register of the plurality of mode registers.

10. An apparatus comprising:
a host configured to communicate with a memory over a link, the host being configured to issue mode register commands to program a plurality of mode registers in the memory, each mode register corresponding to a link speed and comprising a plurality of operands to indicate write link error correction code disable or write link error correction code enable, and to indicate read link error correction code disable or read link error correction code enable, and the plurality of mode registers corresponding to different link speeds,
wherein the host indicates to the memory a protection mode to be applied by notifying the memory one of the plurality of mode registers corresponding to the protection mode, when the link speed changes.

11. The apparatus of claim 10, further comprising the link and the memory.

12. The apparatus of claim 11, wherein each of the plurality of mode register comprises two bits to indicate the write error correction code disable or the write error correction code enable and two bits to indicate the read error correction code disable or the read error correction code enable.

13. The apparatus of claim 11, wherein the plurality of mode registers corresponds to three link speeds, including a high speed and a low speed.

14. The apparatus of claim 11, wherein the apparatus is incorporated into a device selected from a group consisting of a music player, a video player, an entertainment unit, a navigation device, a communication device, a mobile device, a mobile phone, a smartphone, a personal digital assistant, a fixed location terminal, a table computer, a computer, a wearable device, a laptop computer, a server, and a device in an automotive vehicle.

15. The apparatus of claim 10, wherein a combination of the write error correction code disable or write error correction code enable and the read error correction code disable or the read error correction code enable indicated by the plurality of operands of each mode register of the plurality of mode registers is different from a combination of the write error correction code disable or write error correction code enable and the read error correction code disable or the read error correction code enable indicated by the plurality of operands of any other mode register of the plurality of mode registers.

16. A method of an apparatus, the apparatus comprising a host and a memory configured to communication with each other over a link, the method comprising:
issuing, by the host, mode register commands to program a plurality of mode registers in the memory, each mode register corresponding to a link speed and comprising a plurality of operands to indicate write link error correction code disable or write link error correction code enable, and to indicate read link error correction code disable or read link error correction code enable, and the plurality of mode registers corresponding to different link speeds,
indicating, by the host to the memory, a protection mode to be applied by notifying the memory one of the plurality of mode registers corresponding to the protection mode, when the link speed changes.

17. The method of claim 16, wherein each of the plurality of mode register comprises two bits to indicate the write error correction code disable or the write error correction code enable and two bits to indicate the read error correction code disable or the read error correction code enable.

18. The method of claim 17, wherein the plurality of mode registers corresponds to three link speeds, including a high speed and a low speed.

19. The method of claim 18,
wherein the three link speeds also include a middle speed, and
wherein the plurality of operands of the mode register corresponding to the high speed indicates the write link error correction code enable and the read link error correction code enable,
wherein the plurality of operands of the mode register corresponding to the low speed indicates the write link error correction code disable and the read link error correction code disable, and
wherein the plurality of operands of the mode register corresponding to the middle speed indicates the write link error correction code enable and the read link error correction code disable or indicates the write link error correction code disable and the read link error correction code enable.

20. The method of claim 16, wherein a combination of the write error correction code disable or write error correction code enable and the read error correction code disable or the read error correction code enable indicated by the plurality of operands of each mode register of the plurality of mode registers is different from a combination of the write error correction code disable or write error correction code enable and the read error correction code disable or the read error correction code enable indicated by the plurality of operands of any other mode register of the plurality of mode registers.

* * * * *